Aug. 18, 1953     P. E. HAWKINSON     2,648,937
ANNULAR ROTARY WORK SUPPORT AND TIRE BEAD CENTERING DEVICE
Filed June 28, 1950     2 Sheets-Sheet 1
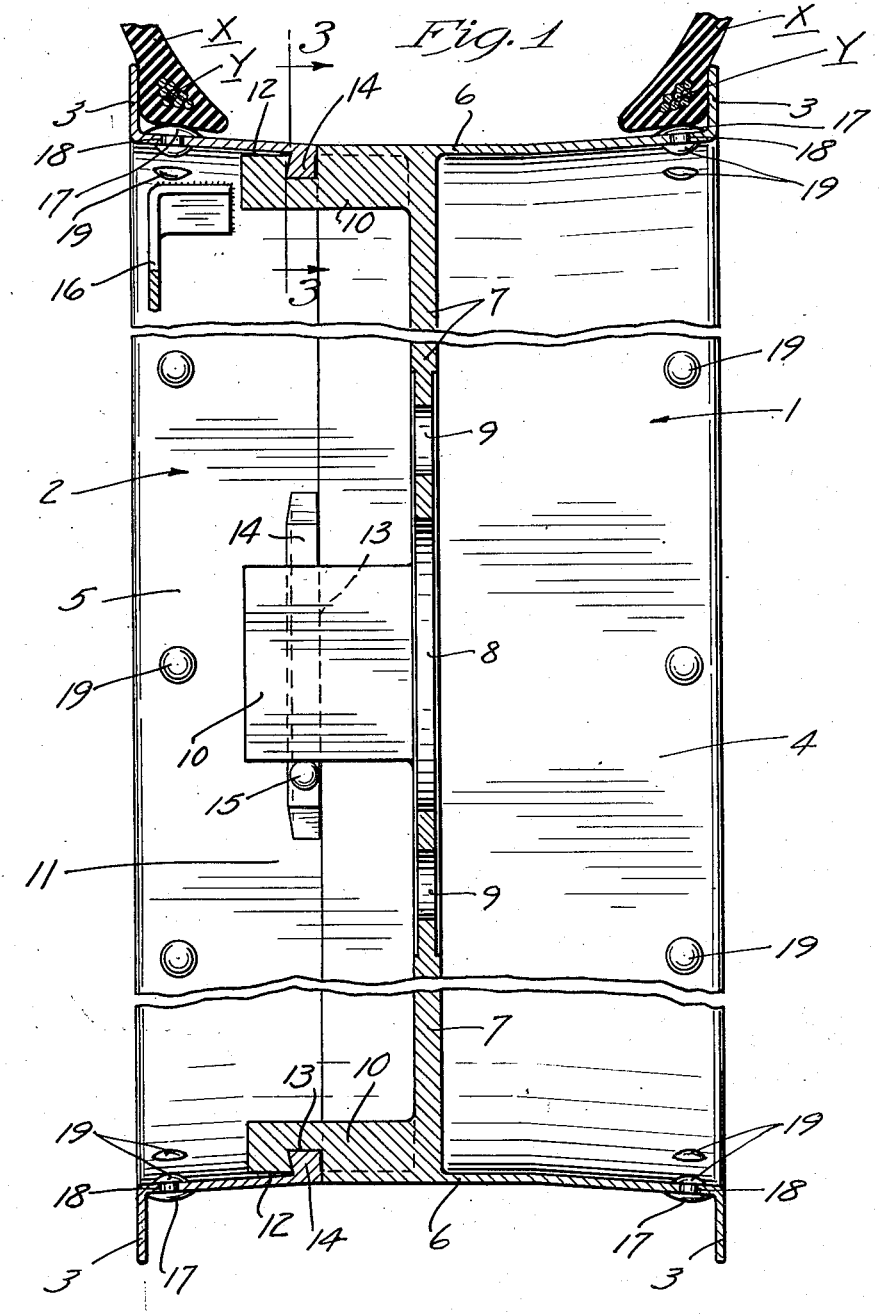
Inventor
Paul E. Hawkinson
By his Attorneys
Merchant & Merchant Aug. 18, 1953　　　P. E. HAWKINSON　　　2,648,937
ANNULAR ROTARY WORK SUPPORT AND TIRE BEAD CENTERING DEVICE
Filed June 28, 1950　　　　　　　　　　　　　2 Sheets-Sheet 2
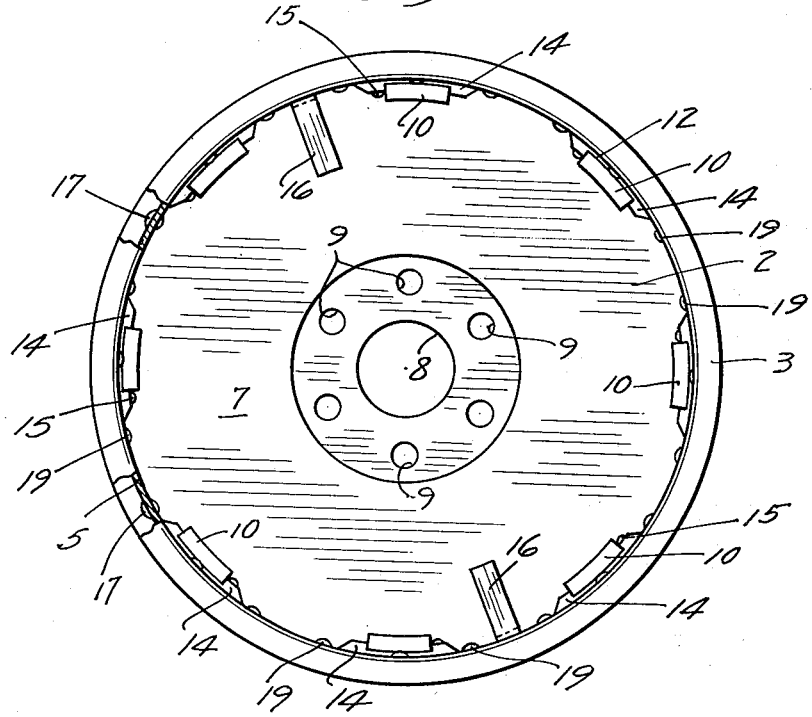
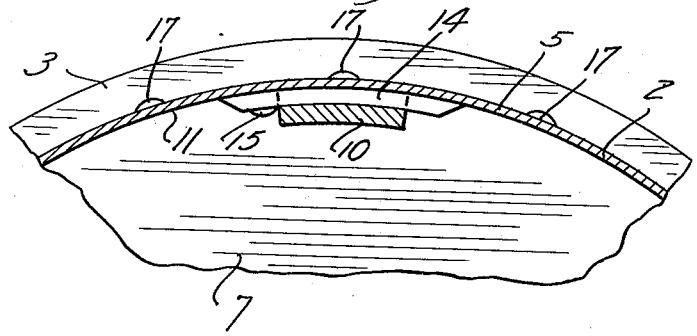
Inventor
Paul E. Hawkinson
By his Attorneys
Merchant & Merchant Patented Aug. 18, 1953

2,648,937

UNITED STATES PATENT OFFICE 2,648,937

ANNULAR ROTARY WORK SUPPORT AND TIRE BEAD CENTERING DEVICE

Paul E. Hawkinson, Minneapolis, Minn., assignor to Paul E. Hawkinson Company, Minneapolis, Minn., a corporation of Minnesota Application June 28, 1950, Serial No. 170,805

3 Claims. (Cl. 51—237)

My invention relates generally to improvements in an annular rotary work support and bead centering device for pneumatic tire casings and, more particularly, to a device of the type utilized in precision tire buffing machines, tire balancing machines, and the like.

One such machine is illustrated in my copending United States patent application S. N. 116,180, filed September 16, 1949, now Patent No. 2,610,446, dated September 16, 1952, entitled "Machine for Buffing Tires." In machines of this type, it is highly desirable not only that the tire casing be rotated on its true center, but also that the tire be quickly mounted on and removed from the head centering rotary work support on which it is placed during such treatment.

The primary object of my invention is the provision of highly efficient and inexpensive means for centering a tire on a rotary work support, for the purpose stated.

Another object of my invention is the provision of a rotary work support of the type stated, in which the tire may be quickly placed in a truly centered position on the work support and quickly removed therefrom.

A still further object of my invention is the provision of a tire bead centering rotary work support of the type described, which is inexpensive to produce, easy to operate, and extremely durable.

The above and still further highly important advantages and objects of my invention will become apparent from the following detailed specification, appended claims, and attached drawings.

Referring to the drawings, which illustrate the invention and in which like characters indicate like parts throughout the several views:

Fig. 1 is a transverse section of my novel tire bead centering work support, some parts being broken away, and illustrating the position of the beads of a pneumatic tire casing mounted thereon;

Fig. 2 is a view in side elevation, looking from left to right with respect to Fig. 1, the scale thereof being substantially reduced; and Fig. 3 is a fragmentary view in section, taken on the line 3—3 of Fig. 1.

Referring with greater particularity to the drawings, the numerals 1 and 2 respectively indicate the work gripping and centering annular matching rim sections of the rotary work support, each of which, at its outer free edge, is provided with a radially outwardly-projecting tire bead-engaging flange 3 and generally cylindrical portions 4 and 5 respectively which cooperate to form a band 6 intermediate the flanges 3. As shown, the annular section 1 is provided with a radially inwardly extending annular mounting flange 7, the central opening of which is identified by the numeral 8. A plurality of circumferentially-spaced openings 9 around the opening 8 facilitate locking the flange and annular sections against rotation on a spindle not shown. Furthermore, the annular section 1, preferably and as shown, is provided with a plurality of circumferentially-spaced anchoring members 10 which project axially-outwardly therefrom in closely-spaced relation to the internal peripheral surface 11 of the cylindrical portion 5. The radially outer surfaces 12 of the anchoring members 10 are provided with slots 13 which are adapted to receive one of the circumferentially-spaced locking tongues 14 on the radially inner peripheral surface 11 of the section 2. As shown, each of the locking tongues 14 is provided with a stop pin 15 which limits circumferential movement of the sections relative to each other in one direction. Also, preferably and as shown, the section 2 is provided with a pair of diametrically-opposed handle members 16 which facilitate partial rotation of section 2 with respect to section 1, for purposes of locking and unlocking same in gripping and mounting a tire upon the rotary work support.

Adjacent the flanges 3, the band 6 is provided with a plurality of circumferentially-spaced radially outwardly-projecting bead-engaging and centering portions or members 17, preferably and as shown these outwardly projecting bead centering portions are in the nature of round-headed rivets which project through openings 18 in the annular one piece band of each of the sections 1 and 2, and are provided with locking heads 19 on the inner side thereof. After the bead supporting and centering members 17 have been inserted, as shown in Fig. 1, they may be ground, filed, or the like, until each thereof projects radially outwardly precisely the same extent from the true center of the opening 8. The trueing of the two annular series of spaced outwardly projecting bead supporting members may be accomplished with simple tools for the ease and accuracy required to truly center a tire thereon for operation in the machine referred to. This feature is important in that it makes use of felly bands which are slightly untrue in this respect.

My novel construction as described is adapted to be used in conjunction with tire casings X which have internal diametric dimensions slightly greater than the maximum diameter of the band 6. When casings of this type are placed upon the band 6 and internal expanding pressure applied thereto by medium of an inner tube not shown, the bead portions Y are forced laterally apart, causing same to ride up upon the outwardly rounded centering members 17 until they come to rest against the flanges 3. The tapered side edges of the outwardly projecting centering members 17 greatly facilitate elevation of the beads Y to the position of Fig. 1. In this position, the tire casing X is perfectly centered with respect to the aperture 8 and the tire is properly positioned for precision buffing preparatory to applying a new tread thereto. Furthermore, the two laterally spaced outwardly projecting annular series of centering members 17 permit quick unseating of the beads Y therefrom with much greater facility than would a single circumferentially-extended rib. In fact, with my novel structure, I have found that the sections 1 and 2 may be made to drop out of contact with the bead portions Y merely by gravity. The improved rotary work support including tire bead centering means as herein disclosed is adapted for use in a tire buffing and balancing machine of the type disclosed in the present inventor's Patent No. 2,392,667.

My invention has been thoroughly tested and found to be completely satisfactory for the accomplishment of the above objects; and, while I have shown a commercial embodiment thereof, I wish it to be understood that my invention is capable of modification without departure from the spirit and scope of the appended claims.

What I claim is:

1. An annular rotary work support and tire bead centering device, comprising a substantially cylindrical band including laterally opposed detachable sections each of which is provided at its outer edge with an endless radially-outwardly projecting tire casing bead-engaging flange, each of said sections adjacent its respective flange being provided with a plurality of circumferentially-spaced outwardly projecting rounded knobs which project radially outwardly from the band to high points precisely equi-distant from the axis thereof and which are adapted to underlie the beads of the tire casing and center the same, said band loosely receiving said beads in a collapsed condition of the tire casing and said knobs snugly receiving said beads in a distended condition of the tire casing.

2. The structure defined in claim 1 in which the axes of said knobs converge toward the longitudinal central plane of said band outwardly thereof.

3. Means for supporting an inflated pneumatic tire casing for true rotation thereof about its axis, comprising a generally cylindrical band including a pair of readily detachable sections each of which is provided at its outer edge with an endless radially outwardly projecting tire casing bead-engaging flange, each of said sections adjacent its respective flange being provided with a plurality of circumferentially spaced tire casing bead supporting knobs which project radially outwardly from the band to points in an imaginary cylindrical surface co-axial with the band and of greater diameter than same; said band loosely receiving said beads in a deflated condition of the casing and said knobs snugly receiving the beads and supporting same in spaced relation to the band in an inflated condition of the casing.

PAUL E. HAWKINSON.

References Cited in the file of this patent

UNITED STATES PATENTS

| Number | Name | Date |
| --- | --- | --- |
| 2,254,526 | Hawkinson | Sept. 2, 1941 |
| 2,270,119 | Green | Jan. 13, 1942 |
| 2,272,962 | Tatter et al. | Feb. 10, 1942 |
| 2,321,936 | Pollock | June 15, 1943 |
| 2,333,599 | Terry | Nov. 2, 1943 |